March 23, 1965 L. H. LONDO 3,174,269
MECHANICAL FRUIT TREE PICKER
Filed Sept. 26, 1963 3 Sheets-Sheet 1

INVENTOR
LLOYD H. LONDO

BY Donald J. Casser

ATTORNEY

March 23, 1965
L. H. LONDO
3,174,269
MECHANICAL FRUIT TREE PICKER
Filed Sept. 26, 1963
3 Sheets-Sheet 2
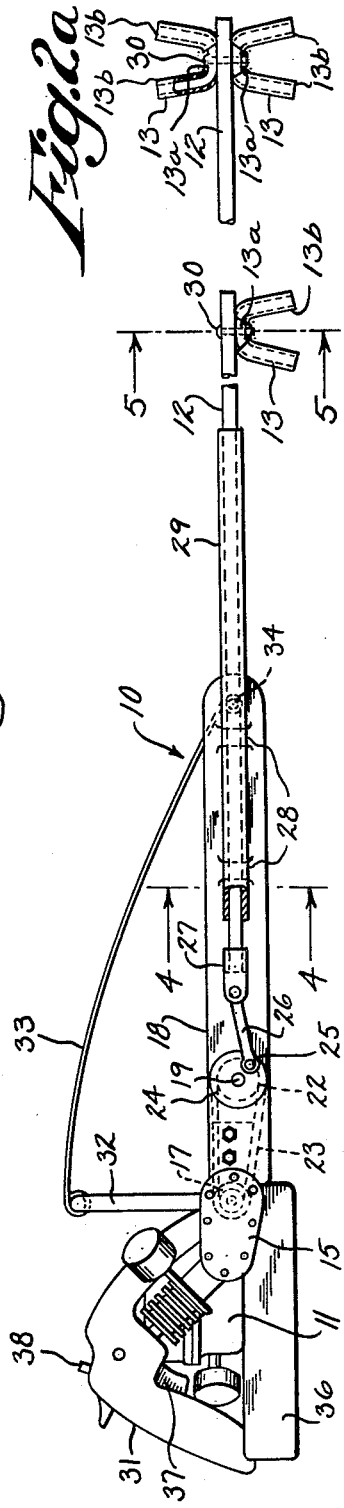
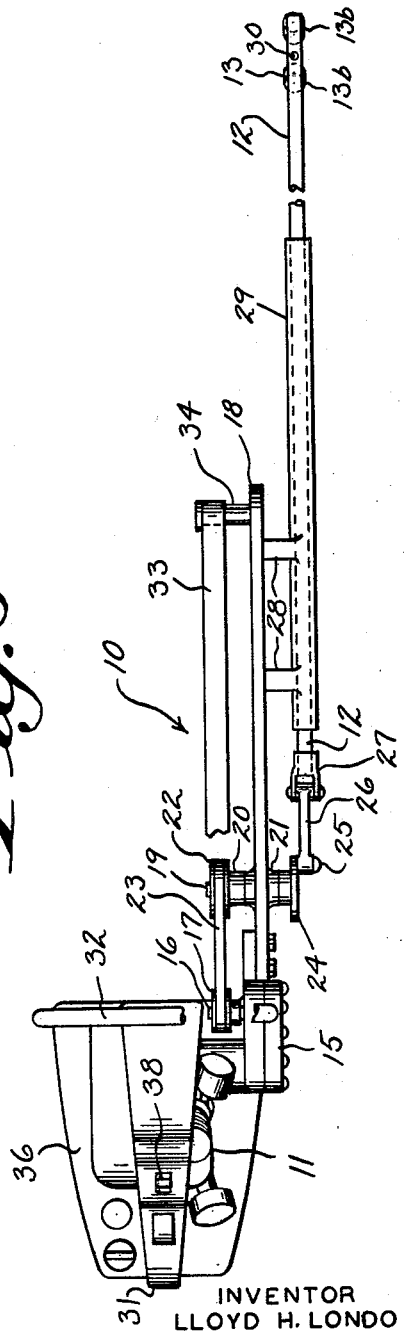
INVENTOR
LLOYD H. LONDO
BY  *Donald J. Casser*
ATTORNEY March 23, 1965  L. H. LONDO  3,174,269
MECHANICAL FRUIT TREE PICKER
Filed Sept. 26, 1963  3 Sheets-Sheet 3

INVENTOR
LLOYD H. LONDO

BY

ATTORNEY

United States Patent Office 3,174,269
Patented Mar. 23, 1965

3,174,269
MECHANICAL FRUIT TREE PICKER
Lloyd H. Londo, 33 Joliet Ave., Sturgeon Bay, Wis.
Filed Sept. 26, 1963, Ser. No. 311,759
9 Claims. (Cl. 56—328)

This invention relates to tree picking apparatus; more particularly, it pertains to apparatus for engaging the branch of a fruit tree (or nut tree, etc.) and vibrating the branch so that the fruit is dislodged therefrom for harvesting, which apparatus is adapted to be held and operated by one man.

The cost of picking fruit is probably the major factor in determining whether or not there will be an economically successful season for most fruit growers. However, in recent years, harvesting crops from trees, such as cherry trees, has become increasingly expensive due to the ever-rising labor costs and the decreasing supply of skilled farm workmen to do the picking. During a recent season, 1962, in a major U.S. cherry-growing area, cherries brought 5¢ per pound to the fruit grower but hand picking alone cost him 4¢ per pound. In this past season, 1963, which was one of relatively short cherry supply, the fruit brought 9½¢ per pound but hand picking still cost about 4¢ per pound. Other costs that must be added, e.g. a season's spraying is estimated to cost about 2¢ per pound of fruit, result in an extremely thin profit margin, if any, that has economically depressed many fruit growing areas. Consequently, there has arisen a need for machines that can reduce the expenses of harvesting tree-grown crops, such as fruit, nuts and the like.

The tree shaking machines which are now available, however, are generally unsatisfactory for widespread use for one reason or another. Many of the prior art machines are large units that must be mounted on a tractor so that they utilize the power take-off of the tractor for operation of the machine; these units are expensive and their shaking actuation can often cause destructive damage to the tractor during the course of a single season. Other prior art machines are large self-contained units that are quite expensive and suitable, if at all, only for large-scale operations. These prior art machines grip the trunk or a major or scaffold branch of the tree for shaking, which action is often so severe as to break the bark and thereby cause irreparable damage to the tree. The action of these machines is to violently shake the trunk or limb so as to cause much damage to the fruit, such as breaking the skin and causing a large amount of stems, pitless or bruised fruit, leaves, etc. collected with the crop. These items unduly increase the "tare" in the harvested crop for which the fruit grower is not paid and increase the cost of sorting the fruit. The large machines are also difficult to maneuver in crowded or small orchards and, further, may require a crew of several men to operate the machine and its allied equipment. In addition to these shortcomings, the large machines, since they require a sizable amount of space for maneuvering and because many of them grip a tree trunk or large branch, necessitate pruning of the lower fruit-bearing branches from the tree; it is not unusual to remove 60% of these fruit-bearing branches from some trees such as sour cherry trees in order to present bare main branches or a tree trunk up to about five feet above the gound that can be reached and clamped only by these machines for shaking. This degree of pruning leaves only the tops of the trees for harvestable crops and can mean that as much as two-thirds of the crop in any particular tree is lost since the lowest fruit-bearing branches bear the most fruit.

In the patent literature, large tractor-mounted tree shaking units are shown in U.S. Patents 2,685,775 to Gould et al. and 3,041,811 to Sides; hydraulic units are disclosed in 2,735,255 to Harper et al. and 2,804,743 to Gould et al.; and pneumatic units are shown in 3,013,374 to Balsbaugh and 3,006,130 to Jones. A shaking unit designed to be mounted on and carried by a truck is shown in 2,700,268 to Lowe, a unit carried on a cart is shown in 1,472,262 to Abildgaard, and a self-propelled tree shaking unit is disclosed in 2,891,372 to Goodwin.

The prior art machines, while useful, are unsuitable for many applications and the need for a suitable mechanical fruit picker still remains unsatisfied, as is evidenced by the extensive experimentation and evaluation of various picking machines still being carried out by universities, equipment makers and fruit growers in major fruit centers such as the cherry-growing area of Wisconsin.

The principal object of this invention is to provide a mechanical fruit tree picker that is capable of picking a tree at a minimum cost which is extremely low in comparison to available methods of picking, both manual and mechanical. Other principal objects of this invention are to provide an efficient mechanical fruit tree picker (1) that is portable so as to be operable by one man; (2) that is low in initial cost to be readily available to orchards of various sizes, particularly the smaller orchards; (3) that is low in operating cost; (4) that is capable of picking fruit and the like from a tree with no permanent damage to the tree; (5) that operates to gently dislodge fruit from a tree with a minimum amount of bruised fruit, stems (depending on the crop), leaves, twigs, etc., in the harvested crop; (6) that operates to gently but rapidly vibrate a tree branch to dislodge the fruit instead of violently shaking the same; (7) that can be used without pruning the tree, particularly pruning the lower branches of the tree which often bear the greatest amount of crop; (8) that engages the branches, particularly the fruit-bearing branches, of the tree instead of their trunks or main branches. Another object is to provide an accessory unit for use with engines designed for power drills, chain saws, etc., to permit the rapid conversion thereof to a tree picker that will satisfy the foregoing objects. These and other more specific objects will become apparent from the description which follows.

Briefly stated, this invention provides a portable tree picking apparatus comprising a small, light-weight engine which reciprocatingly drives a boom, the outer end of which boom is adapted to contact the branch of a fruit tree to vibrate the same and cause the fruit to drop to the ground where it can be caught in a net or other suitable collection device for transfer. For a more detailed description, reference is made to the accompanying drawings which form a part hereof and in which there are shown, by way of illustration, several specific forms of apparatus suitable for the practice of this invention; in the drawings, like reference characters designate the same or similar parts in the various views. Each form of apparatus will be described in sufficient detail to enable those skilled in the art to practice this invention but, it is to be understood that other forms of apparatus may be used and that structural changes in the apparatus described herein may be made by those skilled in the art without departing from the true scope and spirit of the present invention. The scope of the present invention is best defined by the appended claims and limitations set out in the following detailed description are not to be taken in a limiting sense except insofar as they may be incorporated in the claims.

In the drawings:

FIG. 2 is a side view, with portions broken away, of the tree picking apparatus illustrated in FIG. 1;

FIG. 2A is a side view of a portion of the apparatus as shown in FIG. 2 showing an alternate form of construction for part of the apparatus;

FIG. 3 is a top view with portions broken away, of the apparatus of FIG. 2;

Figure 1:
FIG. 1 is a perspective view indicating the use of a fruit tree picking apparatus according to this invention for harvesting a cherry tree.

FIG. 1 illustrates a tree picking machine constructed in accordance with this invention. The machine is shown as being held by a man and used to harvest the fruit from a cherry tree. The tree picker 10 is a small, light-weight unit including an engine 11 driving a boom 12. The outermost end of the boom carries a U-shaped means 13 for contacting a branch of the tree. The driving means between the engine 11 and boom 12 is adapted to drive the boom in a linear reciprocating fashion as indicated by the arrows 14. The engine 11 is a small two-cycle, three-quarter horsepower gasoline engine of conventional construction and includes (referring now to FIG. 2) a gas tank 36 at its base, a pistol-type handle grip 31 over its top, a trigger 37 for actuating the accelerator, and a button 38 for grounding the spark plug of the engine to turn it off. In addition, the engine includes a recoil starter, carburetor, choke and other usual allied equipment common to this type of engine. The engine construction forms no part of the present invention and many suitable types are commercially available. Although internal combustion engines are preferred for use with the present apparatus, particularly gasoline powered engines, it may be possible in some instances to also use an electrical motor. The horsepower of the motor will depend to some extent on the type of tree which the apparatus is intended to pick although, for most uses, an engine of from about one-half to five or six horsepower will be satisfactory.

Referring now to FIG. 3, a housing 15 is attached to one side of the engine 11 and encloses the crankshaft of the engine, a speed reduction unit driven by the engine crankshaft and a centrifugal clutch. A motor output shaft 16 projects from the housing 15, which output shaft is driven by a speed reduction unit enclosed within the housing. A sheave 17 is keyed to the shaft 16. An elongated support member 18 is attached at one end to the engine, herein shown as being securely bolted to the housing 15. A drive shaft 19 is journaled in the support member 18, there being suitable shaft supports 20 and 21 on either side of the support member 18 so that the drive shaft 19 projects through both sides of the support member 18. A sheave 22 is keyed to one end of the drive shaft 19 and is connected through an endless V-belt 23 to the sheave 17 on the output shaft 16 from the engine. A disk 24 is keyed to the other end of the drive shaft 19 and an eccentric pin 25 is eccentrically mounted on the disk 24. One end of a link 26 is connected to the pin 25 and the other end of the link is connected to a universal joint 27 which, in turn, is attached to the inner end of the boom 12. The foregoing drive means is thus adapted to impart reciprocating movement to the boom during operation of the engine. Drive means other than that shown, such as one including a cam system, can be used to reciprocatingly drive the boom.

Figure 4:
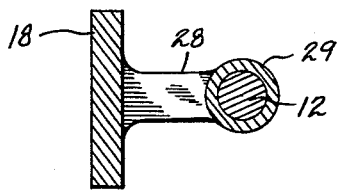
FIG. 4 is a sectional view of the tree picking apparatus taken along the plane of line 4—4 in FIG. 2, looking in the direction of the arrows.

The boom 12 is shown in the drawings as a round pole-like member and may be a wood or metal pole of suitable dimension, but the boom is to be a flexible instead of a rigid member. A pair of brackets 28 are each supported from the support member 18 and they in turn carry a boom guide 29 that comprises a hollow tubular member. The boom 12 extends through the boom guide 29. This relation of the boom and boom guide and support of the housing from the support member is shown in FIG. 4. During operation of the engine, the boom guide serves to direct the boom in linear reciprocating movement, that is, in straight line back-and-forth movement. If desired, bearings may be incorporated in the boom guide to aid movement of the boom relative to the housing. It is important that the boom have this linear movement for two major reasons: (1) to enable the use of tree branch contacting means on the end of the boom which will not break the bark of the tree, and (2) to permit one man to handle the machine for prolonged periods of time without undue strain. As to the former, if the boom did not have linear movement, it would be necessary to use a clamp on the end of the boom to clamp onto the tree during operation. Clamps of the required nature grip the tree so tight as to oftentimes break the tree bark, thereby risking destruction of the branch or trunk which is being clamped inasmuch as a branch with broken bark will probably die by the next season. As to the second, a vertical component to the movement of the boom, as would happen if its motion were only rotary reciprocal motion, would make the apparatus very difficult for one man to hold for any length of time, thereby detracting from the portable nature of the present machine. Although the boom guide illustrated in the drawing is shown in the form of a tubular member, other suitable means can be used to direct the boom in linear reciprocating motion such as, for example, a way or groove in which a carriage supporting the boom can move.

Figure 5:
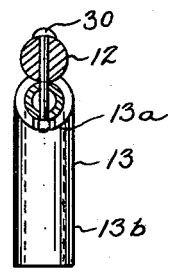
FIG. 5 is a sectional view of the apparatus of FIG. 2 taken along the plane of line 5—5 in FIG. 2, looking in the direction of the arrows.

A U-shaped member is attached to the outer end of the boom 12, shown in the drawings as being attached to the bottom of the boom. As indicated in FIGS. 2 and 3, the bight portion 13a of the U-shaped member is disposed parallel to the axis of the boom 12. Referring to FIG. 5, the U-shaped member 13 may be attached to the boom 12 by means of a bolt 30 passing through the bight portion of the U-member and the boom. Preferably, the U-shaped member is covered with plastic tubing, rubber tubing or other similar flexible, soft material in order to prevent damage to the tree branches. The engine 11 shown in FIGS. 1 through 5 is a multiple position engine capable of being operated in any position, for example, upside down as well as upright. When the engine is not of this type (because of the nature of its carburetor) and can only be operated when upright, preferably there are two such U-shaped members 13 at the end of the boom, one on the top and one on the bottom as shown in FIG. 2A, to facilitate reaching both high and low branches of the tree.

Each U-shaped member 13 includes a pair of spaced upright portions 13b connected by a bight portion 13a. This form of construction provides each member 13 with a pair of fingers that contact the tree branch that is to be picked during operation of the apparatus. While the fingers contact the branch, they do not clamp onto the branch as is common with tree shaking machines of the prior art. The use of the upright fingers as tree contacting means, or some other form of non-clamping type means, is important to the present invention. They greatly lessen the possibility of breaking the bark of the tree branch which they contact during operation and thereby eliminate the problems of killing a branch and breaking the tree branches, particularly the smaller branches. Additionally, their use in the apparatus of the present invention also renders the apparatus suitable for portable use by one man since they prevent the degree of discomfort to the operator that would be present if clamps or other types of devices that actually grip a tree branch were employed. The spacing between the upright portions 13b of the U-shaped members 13 should be sufficient to enable a tree branch of the dimension that will ordinarily be encountered with the tree being picked to be nestled between the two upright fingers. For use with a cherry tree, for example, the spacing can be in the range of from 2 to 3½ inches apart. Thus, the tree branch contacting means for use with the apparatus of this invention is to include at least a pair of spaced upright portions or fingers so that a tree branch may be positioned therebetween to enable vibration of the branch during operation of the apparatus.

To facilitate the handling of the tree picker 10, the engine 11 includes a pistol-type handle grip 31 (FIGS. 2 and 3) at its rearmost end. A transverse bar 32 is attached to the front end of the engine unit and extends from right to left thereof. Near the front end of the support member 18, there is mounted a fixed stub shaft 34. A longitudinal handle-bar 33 is attached at one of its ends to the fixed stub shaft 34 and at its other end to the transverse bar 32. This type of handle means enables a man to lift the apparatus and hold it during operation as illustrated in FIG. 1; other forms of handle means can be incorporated with this invention. Although not shown in the drawings, it is also convenient to use a shoulder harness with the picker. When used, the harness can include a shoulder strap held in place by a belt around the wearer's waist, with a snap hook suspended from the shoulder strap and snapped onto any convenient part of the picker. This harness arrangement further facilitates handling of the picker by one man.

When using the apparatus 10 to pick cherries from a tree, the operator grasps the grip 31 of the engine in one hand and the longitudinal handle-bar 33 in the other. When the engine is running, the output shaft 16 rotates and drives the sheave 17 which in turn drives the sheave 22. The disk 24 and the eccentric pin 25 rotate to impart a reciprocating movement to the boom 12. The boom moves within the boom guide 29 so as to achieve a linear back-and-forth reciprocating motion to prevent undue strain on the operator and improve the vibrating action. As shown in FIG. 1, a branch of the tree is placed between the finger portions of the U-shaped member 13 so that the reciprocating motion of the boom is transmitted to the branch. This causes the branch to vibrate so that the cherries drop from the tree. Although not shown in the drawings, a canvas catcher is placed about the tree along the ground to catch the cherries for shipment to the buyer. When two U-shaped members 13 are on the end of the boom, the higher branches of the tree can be placed in the lower U-member 13 on the end of the boom and the upper U-member 13 can be positioned under the lower branches to facilitate picking both the high and low branches on the tree, although each member can be used to engage either high or low branches.

Figure 6:
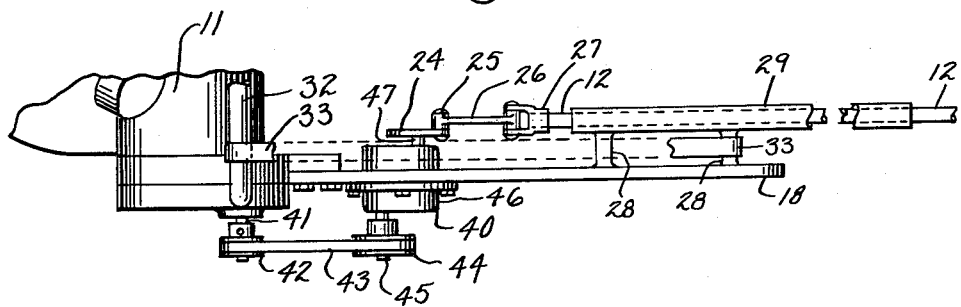
FIG. 6 is a top view, with portions broken away, of an alternate form of tree picking aparatus according to this invention.

FIG. 6 illustrates another form of apparatus according to this invention wherein the support member 18 carries a speed reduction unit 40. In this form, the output shaft 41 of the motor is connected through sheave 42 and endless V-belt 43 to a sheave 44 keyed to the input shaft 45 of the speed reduction unit 40. Enclosed within the housing 46 of the speed reduction unit 40 are intermeshing reducing gears (not shown) connected to an output shaft 47 to which is keyed a disk 24 carrying an eccentric pin 25. The eccentric pin 25 is connected to the boom 12 through a link 26 and universal joint 27 as in the previous embodiment. The longitudinal handle-bar 33 is shown as being mounted at one of its ends to a bracket 28 for the boom guide 29. The operation of this unit is the same as that of the form shown in FIGS. 1–5. The provision of the speed reduction unit on the support member 18 provides adaptation of this invention with engine units that have no self-contained speed reduction unit and also facilitates changing of gears in the unit to be able to alter the linear speed of the boom.

Figure 7:
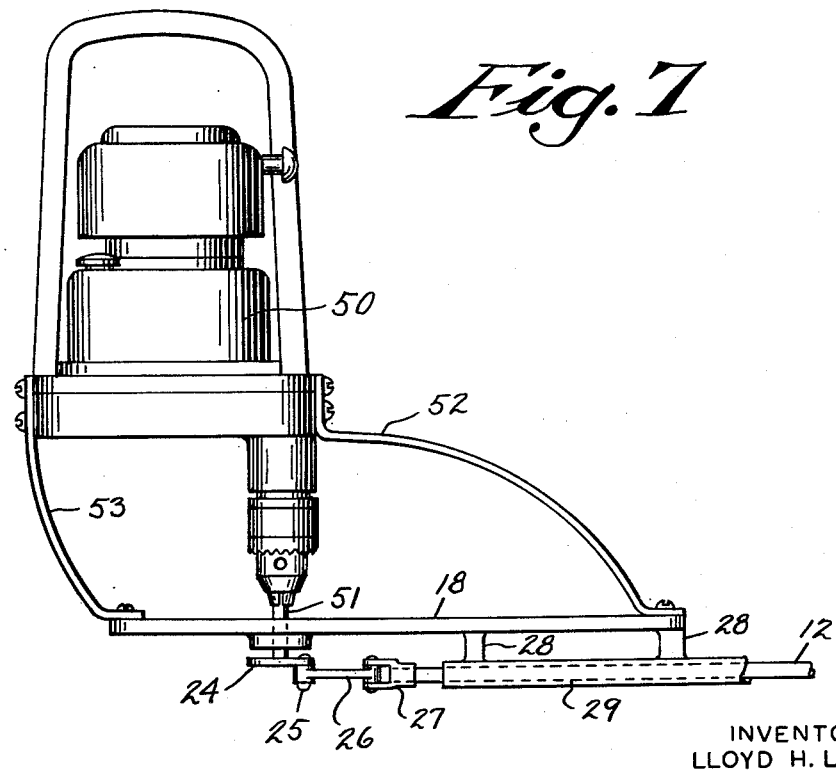
FIG. 7 is a side view with portions broken away of a third form of tree picking apparatus according to this invention.

FIG. 7 depicts a third form of apparatus according to this invention which uses an engine having a vertical output shaft and which also dispenses with the belt drive between the engine and the boom. A gasoline engine 50 drives an output shaft 51 through reduction gearing contained within the engine housing. The support member 18 is attached to the engine housing by means of straps 52 and 53. The output shaft 51 extends through the support member 18 and an eccentric disk 24 is keyed to its lower most end. Eccentric pin 25 mounted on the disk 24 drives the boom 12 through the link 26 from joint 27, with the boom reciprocating within a boom guide 29 attached to the support member 18 by means of brackets 28.

The operation of the forms shown in FIGS. 6 and 7 is the same as that for the embodiment shown in FIGS. 1–5 and will, therefore, not be repeated in detail. In addition to the illustrated alternate forms, the invention has been successfully practiced with an engine of a type used for powered blade saws wherein the saw is reciprocatingly driven directly from a piston that is opposite to the firing piston of the motor. The boom was attached to the blade which was directed to move in a linear direction. Thus, this invention can be used with many different types of engines.

One of the features of this invention is that it may be utilized in the form of an accessory kit for attachment to an engine unit designed to power other tools. Thus, the engines shown in FIGS. 2 and 3 and that shown in FIG. 6 are of the type commonly used to power gasoline-driven chain saws. The combination of a support member 18, boom guide 29, boom 12, and the driving means for the boom can be made as a "kit" and attached to the engine unit after removal of the saw equipment. If the engine unit has no self-contained speed reduction means, a suitable unit can be attached to the support member 18 as in FIG. 6. The engine unit shown in FIG. 7 is of the type used for a gasoline engine-driven drill and the output shaft 51 can fit directly in the drill chuck. This feature not only lessens the cost of the present tree picking apparatus, but enables the fruit grower to use the engine unit for powering other tools when there is no need for harvesting trees. Thus the tree picking apparatus of this invention can be made in the form of a self-contained unit or as an attachment for use with the power source from other forms of engine-driven tools.

In general, the engine of the tree picking apparatus of this invention can be on the order of from ½ to about 5 or 6 horsepower. However, the weight of the engine is more critical than its horsepower since it is essential that the entire tree picking apparatus be light enough to be lifted by one man and handled by him for sufficiently long periods of time, such as an eight or ten hour working day, without excessively tiring the man. Therefore, it is essential that the entire apparatus weigh no more than about 30 to 35 pounds and within this limit, it is preferred that the entire unit weigh between about 10 to 20 pounds for comfortable all-day use. Since the engine constitutes the major portion of this weight, the engine should weigh no more than about 25 pounds, with a light engine of from 10 to 15 pounds being preferred. As to horsepower, a ¾ horsepower engine has been found sufficient to drive the apparatus for picking cherry trees and apple trees. The eccentric disk 24 shown in the drawings can rotate at a speed of about 1700 r.p.m., although this figure can vary about ±1000 r.p.m. The r.p.m. should be selected to prevent excessive engine wear and still give good picking action. In most instances, this will require the use of a speed reduction unit between the engine and the driving means for the boom since gasoline engines in the horsepower range stated above generally revolve at a high output speed of from about 3000 to 5000 or more r.p.m. The length of stroke of the boom, that is, the linear distance that any specific point on the boom moves during its reciprocating movement, is very important.

The boom stroke should be within the range of from 1 inch to 3½ inches, with a stroke length of from 1¼ inches to 2½ inches, being preferred. A boom stroke within this range is necessary in order to prevent breaking branches of the tree being picked. In addition, a longer stroke would increase the physical wear on the used of the apparatus and render it difficult to provide a portable machine that can be readily operated by one man for substantial lengths of time.

*Example*

A fruit tree picking apparatus according to the form illustrated in FIGS. 1–5 was constructed using a ¾ horsepower two-cycle gasoline engine. The engine weighed about 12 pounds. A gear drive rotated the output shaft 16 at a speed of 3500 r.p.m. The output sheave 17 was 1¼ inches in diameter and the sheave 22 was 2½ inches in diameter, so that the eccentric disk 24 was driven at 1750 r.p.m. The eccentric pin 25 was located ¾ inch from the center of the eccentric disk 24 to thereby provide a boom stroke of 1½ inches. The boom itself was a flexible member made of ¾ inch diameter elm wood, and booms from 8 to 12 feet in length were used. The entire apparatus weighed only about 18½ pounds.

Using the foregoing machine constructed according to this invention, 465 pounds of fruit was picked from eight cherry trees in ½ hour by one man at a cost of about 0.18¢ per pound of fruit. The tare in the harvested crop was only 1% and there was absolutely no damage to any of the trees.

An appreciation of the significance of the foregoing results can be had by comparing the cost of picking with the machine of this invention to the cost of picking by hand labor. Using migrant labor, the labor costs alone would have been about 2.1¢ per pound of fruit, or about twelve times the cost of picking the fruit by the tree picker of this invention. Additionally, it is estimated that a fast worker would have taken over 8.1 hours to pick the same amount of fruit that was picked in ½ hour by this machine. As far as tare is concerned, the best hand picking by careful workers averages approximately 6 to 8% tare in the harvested crop but most hand picked crops have approximately 15 to 25% tare. As indicated above, the crop harvested by the machine of this invention had only 1% tare, which reduction in the tare percentage means that the cherries can be used as canning cherries, which are the best grade and command the highest price for the fruit grower since cherries which have over 15% tare are useful only for juice, thereby bringing a comparatively lower price.

With respect to the cost of picking fruit, the percentage of tare and tree damage, the picking apparatus of this invention can also greatly outperform large, self-propelled tree shaking machines. A published report of the experience of picking the same type of cherry trees as above with a large unit of this type indicates that it is anticipated that the cherries can be picked for about ½¢ per pound, or about three times the cost of picking with the machine of this invention. The large machines, because they grip a tree trunk or branch with a clamp device and violently shake the same in order to dislodge the fruit, produce an inordinately large percentage of tare, as high as 30% or even greater, and a recent report of a university study indicated that the presence of additional stems in machine-harvested fruit increased the cost of sorting to about 25% above the cost of sorting handpicked fruit. Beyond this, the prior art machines which clamp onto the tree or branch often cause the bark broken on a major or scaffold branch and sometimes on the tree trunk, which means that the branch will probably die within a year and thereby remove it from productive use. In contrast, there was no apparent damage to any tree picked by the picker of this invention this past season.

The above picker of FIGS. 1–5 was used to pick an apple tree and again produced outstanding results. The stems of the apples separated when the tree branch was picked and the fruit with a portion of the stem attached was harvested. The spurs, which provide the following year's crop remained on the tree. Thus, with apples, there was no loss of spurs as occurs when picking by hand or by the prior art machines, nor was there any visible damage to the fruit or to the tree.

In addition to the foregoing, there are a number of other important differences and advantages attainable with the present picker that the prior art machines cannot provide. The picking action of the machine of this invention is quite different from the shaking action of the prior art machines. With the present machine, the branch is gently but rapidly vibrated so that the fruit is dislodged from the stem, with the stem remaining on the branch and the fruit dropping into the collection device. There was no breaking or tearing of the skin of the fruit. The tree branch itself moves probably only approximately one-half to one inch at the position where the U-shaped member 13 contacts the branch. In contrast, the prior art machines give a powerful shaking action to the branch and often move the branch as much as 10 to 16 inches. This violent shaking action increases the danger of breaking the branches, causes a lot of bruised fruit and fruit with broken skins, increases the tare in the harvested crop, and also is capable of flinging the cherries a long distance, thereby necessitating the use of large high collection devices such as nets. With the machine of this invention, however, the rapid vibrating action causes the fruit to drop almost perpendicular to the collection net or similar device. It has also been found that the machine of this invention can effectively pick cherries from a tree earlier than it would be possible to pick the cherries either by hand or by the prior art machines. It has further been reported that in order to effectively accommodate a large prior art shaking machine, it will be necessary to tailor an orchard for the machine, such as by controlling the spacing, pruning, etc. of the trees, which is not required with the machine of this invention.

This invention has thus provided a portable, low-cost tree picker that can be operated by one man and that, although of relatively simple construction, is capable of yielding important and unexpected advantages when compared to present modes of picking fruit trees and the like. It is to be understood that it is intended to cover all changes and modifications of the examples of this invention herein chosen for the purpose of illustration which do not constitute a departure from the spirit and scope of this invention.

I claim:

1. A mechanical tree picking apparatus that can be lifted and operated by one man comprising, in combination:
   (1) an engine unit including an engine and an engine output shaft;
   (2) a support member attached to the engine unit and extending therefrom;
   (3) a boom guide attached to a portion of the support member;
   (4) an elongated boom extending through the boom guide and having an inner end near the engine and an outer end away from the engine;
   (5) tree branch contacting means attached to the boom at its outer end;
   (6) drive means connected between the engine and the boom and adapted to impart reciprocating movement to the boom when the engine is operating, said boom moving within the boom guide so that the boom moves in a linear reciprocating movement; and
   (7) handle means attached to said apparatus whereby one man can lift the apparatus and hold it while operating the engine and engaging a tree branch to pick the crop therefrom.

2. Apparatus according to claim 1 wherein said drive means (6) comprises a first sheave attached to the output shaft of the engine, a second shaft journaled in the support member, a second sheave attached to the second shaft, an endless belt interconnecting the first sheave to the second sheave, a disk attached to the second shaft, an eccentric pin attached to the disk, and means connecting the inner end of the boom to the eccentric pin.

3. Apparatus according to claim 1 wherein said drive means (6) comprises a first sheave attached to the output shaft of the engine; a speed reducer mounted on the support member and having an input shaft, an output shaft, and speed reduction gears interconnecting said input shaft to said output shaft; a second sheave attached to the input shaft of the speed reducer; an endless belt interconnecting said first sheave and said second sheave; and means attached to the output shaft of the speed reducer and arranged to drive said boom in a reciprocating movement.

4. Apparatus according to claim 1 wherein said tree branch contacting means (5) includes at least a pair of finger portions spaced to receive a tree branch between them.

5. Apparatus according to claim 1 wherein said tree branch contacting means (5) comprises at least one U-shaped member including a bight portion interconnecting a pair of spaced upright portions and that is arranged with its bight portion parallel to the longitudinal axis of the boom.

6. Apparatus according to claim 1 wherein the engine in said engine unit comprises a gasoline engine of from about ½ to 6 horsepower.

7. A mechanical tree picking apparatus that can be lifted and operated by one man comprising, in combination:
 (1) an engine unit including an engine;
 (2) means for supporting a boom from said engine unit;
 (3) a boom supported from the aforesaid means and having an inner end disposed near the engine and an outer end disposed away from the engine, the boom being movable relative to said means and said means being adapted to guide the boom in a linear direction;
 (4) tree branch contacting means disposed at the outer end of the boom;
 (5) drive means connected between the engine and the boom and adapted to impart reciprocating movement to the boom when the engine is operating, said boom having a length of travel in each direction of from about one inch to three and one-half inches; and
 (6) handle means attached to said apparatus whereby one man can lift the apparatus and hold it while operating the engine and engaging a tree branch to pick the crop therefrom.

8. Apparatus for attaching to an engine unit including an engine and an engine output shaft to provide a mechanical tree picking apparatus that can be lifted and operated by one man comprising, in combination:
 (1) a support member adapted to be attached to an engine unit and extending therefrom;
 (2) a boom guide attached to a portion of the support member;
 (3) an elongated boom extending through the boom guide and having an inner end disposed near the engine and an outer end disposed away from the engine;
 (4) tree branch contacting means attached at the outer and of the boom;
 (5) drive means supported on the support member for drivingly conecting an engine unit and the boom and adapted to impart reciprocating movement to the boom when the engine is operating, said boom moving within the boom guide so that the boom moves in a linear reciprocating movement; and
 (6) handle means mounted on said apparatus and adapted for attachment to an engine unit for lifting said apparatus and holding it while operating an engine unit to which the apparatus is attached.

9. Apparatus according to claim 8 wherein said drive means includes a speed reduction unit arranged on the support member and adapted to decrease the speed of an engine unit when driving the boom, said speed reduction unit having an output shaft drivingly connected to the boom.

References Cited by the Examiner
UNITED STATES PATENTS

| | | | |
|---|---|---|---|
| 1,623,497 | 4/27 | Rurup | 56—328 |
| 3,101,583 | 8/63 | Ferguson | 56—328 |
| 3,132,458 | 5/64 | Russell et al. | 56—328 |

T. GRAHAM CRAVER, *Primary Examiner.*

RUSSELL R. KINSEY, *Examiner.*